June 2, 1931. H. W. C. SCHROEDER 1,808,612
DEVICE FOR DOSING COMPRESSED GASES
Filed March 22, 1928
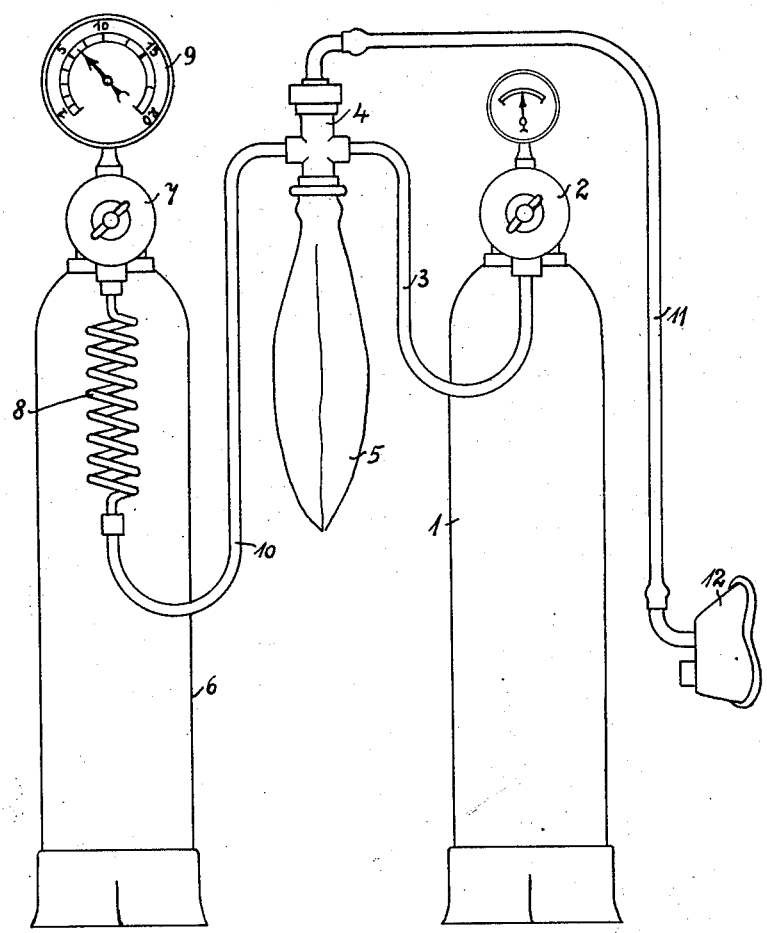
Inventor
Hans W. C. Schroeder
Attorneys Patented June 2, 1931

1,808,612

UNITED STATES PATENT OFFICE

HANS WILHELM CHRISTIAN SCHROEDER, OF LUBECK, GERMANY, ASSIGNOR TO DRÄGERWERK, LUBECK, GERMANY

DEVICE FOR DOSING COMPRESSED GASES

Application filed March 22, 1928, Serial No. 263,800, and in Germany May 24, 1927.

The present invention relates to devices for dosing compressed gases, particularly in connection with anesthetic or other medical inhalation devices. In the practice of medicine, it frequently becomes necessary to give the patient a mixture of independently measured gases and in such instances it is often necessary to considerably vary the amount of one gas with the respect to that of the other or others. Means must therefore be provided for accurately measuring the flow of the gas whose quantity must be varied, and for varying the actual flow within the desired limits.

Where the necessary range of variation in the flow of a gas is small, the problem is relatively simple and can be simply and successfully accomplished by means of apparatus known at present which usually consists of an outlet pipe connected to a reservoir containing gas under pressure which is provided with a pressure reducing valve and a pressure gauge. The outlet pipe is connected to a breathing mask from which it is inhaled by the patient. The pressure gauge may be calibrated to show the rates of flow for the different pressures and the amount of the particular gas contained in the reservoir which is supplied to the patient may thus be controlled by the manipulation of the pressure reducing valve and read off on the pressure gauge.

In practise, these simple means have been found to work satisfactorily well where the ratio of the minimum amount of gas to be supplied by the reservoir to the maximum amount to be supplied is relatively small, for example 1 to 5 or less. As the art developed, however, it became increasingly necessary to provide apparatus capable of regulating and measuring a flow over greater ranges, for example those in which the ratio of the minimum to the maximum flow is greater than 1 to 5. This is particularly true where narcotic gases are used and where the flow of oxygen must sometimes vary in the ratio of 1 to 20.

The old apparatus was found to be impractical where such a great range is required. It was found to be practically an impossibility to calibrate the face of the gauge so as to show the necessary divisions indicating the various rates of flow, for the lower values were very near the zero point and entirely too close together for practical observation when the scale was made to read for the higher values. So great and pronounced was this defect that even on using the entire scale on the gauge, regardless of what the final pressure might be and on using the usual dosing nozzles, the scale could only be divided into five or six readable units each of which represented the minimum amount of flow. Therefore when a range requiring up to twenty times the minimum of flow was required, it was necessary to provide four dosing cocks having nozzles, and to manipulate all four of the cocks to get the various rates of flow within the given range.

It is a general object of the present invention to provide a simplified apparatus for dosing gases over widely varying rates of flow.

Another object is the provision of such an apparatus which does not require a plurality of dosing valves and the increase of costs and increase of attendance inherent therewith.

These and other objects of the invention will become more readily apparent upon a study of the drawing when read in connection with the specification and appended claims.

In the drawing an elevation of an apparatus constructed according to the invention is shown by way of example in connection with a known inhaling appliance for two different gases, for instance an anesthetic device working with oxygen and nitrous oxide.

To the nitrous oxide (laughing gas) is to be added 1 to 20 parts of oxygen, as circumstances may require, to secure a more or less deep narcosis within a prescribed length of time. In accordance with anesthetic practice, the concentration of the laughing gas or the necessary amount of oxygen to be added respectively frequently varies in the course of the narcosis, particularly during the first minutes. The nitrous oxide flows uniformly from the vessel 1 dosed by the pressure reducing valve 2 by the pipe 3 into the member 4 and breathing bag 5. Oxygen is added in regulable amounts from the vessel 6. This is done by means of the pressure reducing valve 7 adjustable to a varying pressure and by a long, wound capillary tube 8. The length and the width of this capillary tube is so dimensioned, that the maximum of oxygen required runs through the same, when the hand of the gauge 9 shows on the last division line of the scale. The added oxygen also passes through the tube 10 into the breathing bag 5. When the mixing within the bag 5 is executed both gases will be inhaled by the pipe 11 and the mask 12.

In the present instance the maximum amount is equal to 20 units of minimum quantity. Owing to the frictional resistance prevailing within the capillary tube, that is, owing to the fact that the capillary tube offers a stream of a gas having a low pressure, a high resistance, and a gas having a higher pressure, a comparatively low resistance, it is possible that a unit of quantity as well as all units of quantity from 1 to 20 will be adjusted accordingly to the gauge 9 and can be distinctly read off. As a practical matter, a great deal less gas will flow through the capillary tube at relatively low pressures than would be emitted from the reservoir in the absence of the capillary tube. At somewhat higher pressures, practically the same amount of flow occurs regardless of whether or not the flow takes place through a capillary tube. To illustrate, in a known apparatus which is not equipped with the capillary tube, 1 liter of gas per minute was dispensed at ¼ atmosphere of pressure and 2 liters per minute were dispensed at 1 atmosphere. In a similar apparatus equipped with the capillary tube, however, less than ½ liter was dispensed at ¼ atmosphere and at 1 atmosphere of pressure 2 liters were also emitted. The resulting effect upon the calibration of the gauge is apparent. The markings for unit rates of flow are substantially evenly distributed over the scale and a much greater range is thus made possible.

The attending of the apparatus consists solely in regulating the pressure in known manner. The capillary tube may be adjusted to meet a variety of exigencies including differently compressed gases, by arranging narrower or wider serpentine-like or coil windings having longer or shorter straight sections or parts. Depending on the range of operations, which may even pass 1 to 20 units of quantity, pipes of a length of from 20 to 100 cm. may be used.

Having thus described my invention, what I now claim as new and desire to secure by Letters Patent of the United States is as follows:

1. A device for dosing compressed gases in regulatable amounts comprising an outlet communicating with a source of gas under pressure, a pressure reducing valve in said outlet, a capillary tube having a length of at least 20 centimeters connected to the outlet, and a pressure gauge connected to said outlet at a point between the capillary tube and the source of gas, the gas being adapted to flow past the pressure reducing valve before entering the capillary tube.

2. A device for dosing compressed gases in regulatable amounts comprising an outlet communicating with a source of gas under pressure, a pressure reducing valve in said outlet, a pressure gauge connected to the outlet, and a coiled capillary tube having a length of at least 20 centimeters connected to the outlet at its open end.

3. A device for dosing compressed gases in regulatable amounts comprising an outlet communicating with a source of gas under pressure, a pressure reducing valve in said outlet, a pressure gauge in said outlet, and a capillary tube having a length of at least 20 centimeters bent to form a tortuous path for the gas escaping from its source connected to said outlet at its open end.

4. A device for dosing compressed gases in regulatable amounts which comprises an outlet communicating with a source of gas under pressure, a pressure reducing valve in said outlet, a pressure gauge in the outlet, and a capillary tube connected to the open end of said outlet, said tube having a length of at least 20 centimeters so as to offer a relatively greater resistance to a stream of gas under low pressure than to a stream of gas under high pressure whereby the scale on the pressure gauge may be calibrated for a wide range of rates of flow.

5. A device for dispensing compressed gases in regulatable amounts comprising a source of gas under pressure and having an outlet connected therewith, a pressure regulating valve in said outlet, a pressure gauge connected to the outlet, and a capillary tube having a length of at least 20 centimeters communicating with the discharge end of said outlet, said capillary tube presenting a relatively high resistance to the gas when flowing at minimum pressure and presenting relatively lower resistances to the passage of the gas when flowing at higher pressures, whereby the range of graduations on the scale of the pressure gauge may be increased.

In testimony whereof I have signed my name to this specification.

HANS WILHELM CHRISTIAN SCHROEDER.